(12) United States Patent
Bonte et al.

(10) Patent No.: US 11,246,265 B2
(45) Date of Patent: Feb. 15, 2022

(54) AGRICULTURAL SYSTEM

(71) Applicant: CNH Industrial America LLC, New Holland, PA (US)

(72) Inventors: Xavier G J M Bonte, Zuidzande (NL); Kenneth De Leener, Oostkamp (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/092,579

(22) Filed: Nov. 9, 2020

(65) Prior Publication Data

US 2021/0140359 A1 May 13, 2021

(30) Foreign Application Priority Data

Nov. 8, 2019 (EP) ..................................... 19208185

(51) Int. Cl.
*A01F 15/08* (2006.01)
*F01P 7/14* (2006.01)
*F01P 7/00* (2006.01)

(52) U.S. Cl.
CPC ............ *A01F 15/0841* (2013.01); *F01P 7/00* (2013.01); *F01P 2007/146* (2013.01); *F01P 2025/04* (2013.01); *F01P 2025/36* (2013.01)

(58) Field of Classification Search
CPC .... F01P 7/00; F01P 2007/146; F01P 2025/04; F01P 2025/36; A01F 15/0841
USPC ..................................................... 123/41.02
See application file for complete search history.

(56) References Cited

U.S. PATENT DOCUMENTS

2016/0025211 A1* 1/2016 Schaefer ................. F16H 59/46
701/58
2016/0081258 A1* 3/2016 Bonte .................. A01F 15/0841
74/15.4

FOREIGN PATENT DOCUMENTS

DE 102013205358 A1 10/2014

OTHER PUBLICATIONS

Extended European Search Report for EP application 19208185.9, dated Apr. 3, 2020 (8 pages).

* cited by examiner

*Primary Examiner* — Mahmoud Gimie
(74) *Attorney, Agent, or Firm* — Peter Zacharias; Patrick Sheldrake

(57) ABSTRACT

An agricultural system including an agricultural baler and a control unit. The baler includes a driveline including at least one heat generating component; a rotatable flywheel; a rotary input shaft connectable by the driveline to the rotatable flywheel; and at least one pump for supplying cooling fluid at a cooling fluid pressure to the at least one heat generating component. The control unit is configured to: receive baler-data indicative of one or more operating conditions of the agricultural baler; receive cooling-pressure-data indicative of a flow of the cooling fluid supplied by the at least one pump; set a threshold-condition based on the baler-data; and provide a control-signal to the agricultural baler based on a comparison between the cooling-pressure-data and the threshold-condition.

13 Claims, 7 Drawing Sheets

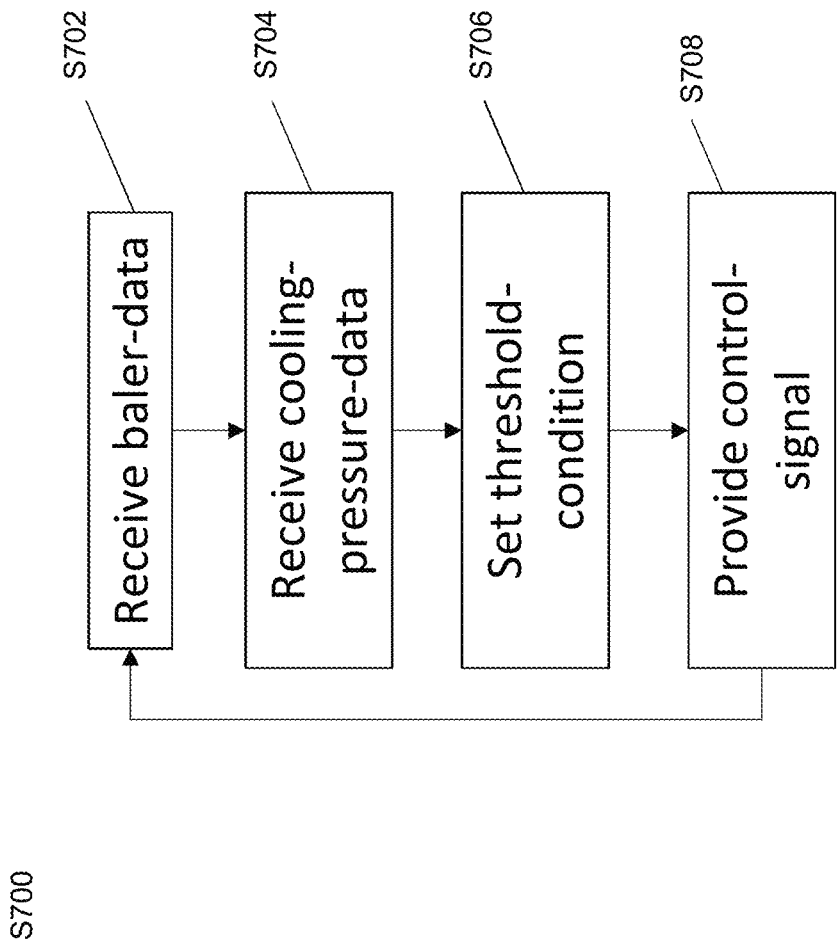

AGRICULTURAL SYSTEM

FIELD OF THE INVENTION

The invention relates to an agricultural baling system comprising an agricultural baler, particularly but not exclusively, a baler implement. Other aspects of the present invention relate to a method of controlling an agricultural baler and a corresponding computer program.

BACKGROUND OF THE INVENTION

Baling machines are well known in agriculture and are widely used to bale plant matter in fields into bales that may be conveniently and effectively handled, stored and used. Baling machines are known that bale forage products such as grass and other leaves used as hay or other types of animal feed; straw or other plant parts resulting as by-products from a harvesting operation such as combine harvesting; cotton; and other plant parts of commercial or other value.

The majority of baling machines in use in Europe are designed to be towed behind an agricultural tractor or another towing vehicle that, under the control of an operator and/or using operator-monitored software, moves the baling machine about a field and provides power to operate internal parts of the baling machine. The provision of power is effected by way of a rotatable power take-off (PTO) shaft connected to the rotary power take-off that typically is part of the tractor.

Known designs of agricultural baling machine include a pick-up, mounted at the front of the machine, that causes the ingestion of plant matter into the interior of the machine as it moves about a field. Differing internal designs of baler components are known in the part of the machine downstream of the pick-up.

One commonplace type of baling machine is often referred to as a "rectangular baler". This includes a cuboidal bale-forming chamber in which the ingested plant matter is compacted into a cuboidal shape by a piston or plunger that reciprocates longitudinally back and forth inside the bale-forming chamber between retracted and extended positions. Charges of plant matter repeatedly are fed into the bale-forming chamber from the pick-up by the mechanism of the baling machine. This action is timed with the motion of the plunger such that feeding of plant matter coincides with retraction of the plunger to one end of the bale-forming chamber. The plant matter then is compacted by subsequent extension strokes of the plunger along the bale-forming chamber.

The reciprocal rectilinear motion of the plunger is effected using a driveline that converts rotary drive derived from the rotating PTO shaft, connected to the baling machine above the pick-up, into reciprocal motion of the plunger. This typically is achieved by changing, in the driveline, the axis of the rotation from one parallel to the longitudinal length of the baling machine to an axis of rotation transverse thereto.

Such transverse-axis rotation is applied to a crank that is pivot-jointed to one end of a conrod the other end of which is pivot-jointed to the plunger, that is moveably captive inside the bale-forming chamber. As a result, rotation of the crank causes the reciprocal movement of the plunger.

The driveline between the power take-off of the tractor and the plunger includes a clutch that in a typical case is formed of two or more dry friction plates that are urged into mutual engagement by a hydraulic actuator or spring arrangement. Additionally a heavy flywheel (that in some baling machine designs weighs 600 kg or more) is secured to a rotatable shaft that defines or is connected to an input shaft in turn connected in use to the PTO shaft.

The flywheel is needed because the plunger during its motion is associated with very high, and highly varying, levels of power that might peak at 1500 Hp (about 1100 kW). In the absence of the flywheel it might be impossible for the rotary power take-off of a tractor to provide sufficient power to move the plunger, and very high forces might be transmitted back towards the tractor via the PTO shaft potentially causing damage to the baling machine or tractor or making the tractor-baling machine combination difficult to control.

The flywheel has high levels of inertia and, in order to prevent injuries and unnecessary wear of the flywheel shaft bearings, it is desirable to stop rotation of the flywheel as swiftly as possible once the PTO shaft has stopped providing power to the agricultural baler (e.g. when the tractor engine is turned off). Some balers include brakes for actively stopping the flywheel when the baler is deactivated.

Engagement of the above clutches and/or activation of the flywheel brake may generate excessive amounts of heat that are typically dissipated by using cooling fluid provided to the clutches and the brakes. Such cooling fluid is provided by large cooling pumps that are sized to provide sufficient amounts of cooling fluid to the above components at all stages of the baler operation. The initial costs and operating costs associated with such cooling pumps are high.

Examples disclosed herein seek to solve or ameliorate one or more problems of prior art baling machines.

Embodiments of the disclosure are suitable for inclusion in all baling machine types and machinery combinations disclosed herein. The disclosure of embodiments or parts of embodiments herein includes their disclosure in combination with all baling machine types and machinery combinations herein, even if these are indicated as forming part of the prior art.

The terms "baling machine" and "baler" are used synonymously herein and in the art generally.

The term "power take-off" is synonymous with the acronym "PTO".

The term "tractor" embraces a wide variety of machines potentially capable of towing a baling machine, as will be known to the person of skill in the art.

The term "clutch" except as otherwise explained embraces any design of clutch that is suitable for transferring drive in the circumstances described.

The term "plant matter" and derivatives potentially includes all types of matter that potentially may be ingested into a baling machine for the purpose of being formed into bales.

The terms "piston" and "plunger" in the context of the principal, moveable, bale-forming part of a bale-forming chamber are used synonymously herein.

SUMMARY OF THE INVENTION

Aspects and embodiments of the disclosure provide an agricultural baler, an agricultural machinery and a method for controlling an agricultural baler as claimed in the appended claims.

According to a first aspect, there is provide an agricultural system comprising:

an agricultural baler comprising:

a rotary input shaft connectable by way of a baler driveline to a rotatable flywheel, the driveline comprising at least one heat generating component; and at least one pump for supplying cooling fluid at a cooling fluid pressure to the at least one heat generating component; and a control unit that is configured to:

receive baler-data indicative of one or more operating conditions of the agricultural baler;

receive cooling-pressure-data indicative of the cooling fluid flow provided by the at least one pump;

set a threshold-condition on the basis of the baler-data; and provide a control-signal to the agricultural baler based on a comparison between the cooling-pressure-data and the threshold-condition.

Such an agricultural system can advantageously enable the control unit to provide a control-signal (which may be for taking remedial action) based on a dynamically set threshold-condition. This can result in improved baler operation, for instance the baler may not be unnecessarily shut down, which would reduce the efficiency and effectiveness of a baling operation.

The threshold-condition may comprise a threshold-pressure-level. The control unit may be configured to:

set the threshold-pressure-level on the basis of the baler-data; and provide a control-signal based on whether or not the cooling-pressure-data is greater than the threshold-pressure-level.

The threshold-condition may comprise a threshold-duration and a threshold-pressure-level. The control unit may be configured to:

set the threshold-duration on the basis of the baler-data; and provide a control-signal based on whether or not the cooling-pressure-data is greater than the threshold-pressure-level for a period of time that is at least the threshold-duration.

The control-unit may be configured to adjust the threshold-duration on the basis of a comparison between the cooling-pressure-data and the threshold-pressure-level.

The control-signal may be for disconnecting the rotary input shaft from the flywheel.

The baler-data may include driveline-data indicative of a current activation status of the at least one heat generating component of the driveline.

The driveline-data may comprise one or more of the following:

input-power-data indicative of external input power provided to the agricultural baler;

transmission-control-data indicative of a requested change in transmission;

actuation-pressure-data indicative of a hydraulic fluid pressure that is applied to the at least one heat generating component for actuation; and position-data indicative of movement of the heat generating components.

The baler-data may include cooling-fluid-data indicative of a status of the cooling fluid provided to the at least one heat generating component.

The cooling-fluid-data may comprise:

data relating to the temperature of the cooling fluid;

data relating to the viscosity of the cooling fluid;

data relating to the service time of the cooling fluid; and data relating to the type of the cooling fluid.

The at least one heat generating component may comprise a clutch. The baler-data may comprise a current engagement status of the clutch.

The control unit may be configured to:

set the threshold-pressure-level to a first threshold-pressure-level value when the baler-data indicates that the clutch is in the process of being engaged; and set the threshold-pressure-level to a second threshold-pressure-level value when the baler-data indicates that the clutch is disengaged or fully engaged. The second threshold-pressure-level value may be lower than the first threshold-pressure-level value.

The at least one heat generating component may comprise a brake. The baler-data may comprise a current activation status of the brake.

The control unit may be configured to:

set the threshold-pressure-level to a first threshold-pressure-level value when the baler-data indicates that brake is active; and set the threshold-pressure-level to a second threshold-pressure-level value, when the baler-data indicates that the brake is inactive. The second threshold-pressure-level value may be lower than the first threshold-pressure-level value.

The at least one heat generating component may comprises a clutch. The baler-data may comprise a current engagement status of the clutch. The control unit may be configured to set the threshold-duration such that, when the baler-data indicates that the clutch is in the process of being engaged, the threshold-duration is shorter than when the baler-data indicates that the clutch is disengaged or fully engaged.

The at least one heat generating component may comprise a brake. The drive-line data may comprise a current activation status of the brake. The control unit may be configured to set the threshold-duration such that, when the baler-data indicates that the brake is active, the threshold-duration is shorter than when the baler-data indicates that the brake is inactive.

According to a further aspect, there is provided a computer-implemented method for controlling an agricultural baler, said baler comprising:

a rotary input shaft connectable by way of a baler driveline to a rotatable flywheel, the driveline comprising at least one heat generating component; and at least one pump for supplying cooling fluid at a cooling fluid pressure to the at least one heat generating component; and wherein the method comprises:

receiving baler-data indicative of one or more operating conditions of the agricultural baler;

receiving cooling-pressure-data indicative of the cooling fluid flow provided by the at least one pump;

setting a threshold-condition on the basis of the baler-data; and providing a control-signal to the agricultural baler based on a comparison between the cooling-pressure-data and the threshold-condition.

According to another aspect of the present disclosure, there is provided an agricultural machinery comprising any agricultural baler discussed herein (e.g. a baler implement) and an agricultural vehicle for transporting the agricultural baler implement. There may be provided a computer program, which when run on a computer, causes the computer to configure any apparatus, including a control unit, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EE-PROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

The agricultural work vehicle (or tractor) may include one or more control devices, such as but not limited to programmable or non-programmable processors. Similarly, the baler implement may include one or more control devices, such as but not limited to programmable or non-programmable processors. Additionally, or alternatively, the baler implement may be controlled by one or more control devices of the agricultural work vehicle. Similarly, the agricultural work vehicle may be controlled by one or more control devices of the baler implement.

The agricultural work vehicle and/or the baler implement may be remote controlled, e.g. from a farm office. Accordingly, the agricultural work vehicle may include one or more communication interfaces for connection to a remote processor and/or a remote controller. Similarly, the baler implement may include one or more communication interfaces for connection to a remote processor and/or a remote controller.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a description of preferred embodiments of the disclosure, by way of non-limiting example, with reference being made to the accompanying drawings in which:

FIG. 7 is a schematic flow chart of the method for controlling an agricultural baler according to an embodiment of the present disclosure.

DETAILED DESCRIPTION OF THE DRAWINGS

Figure 1:
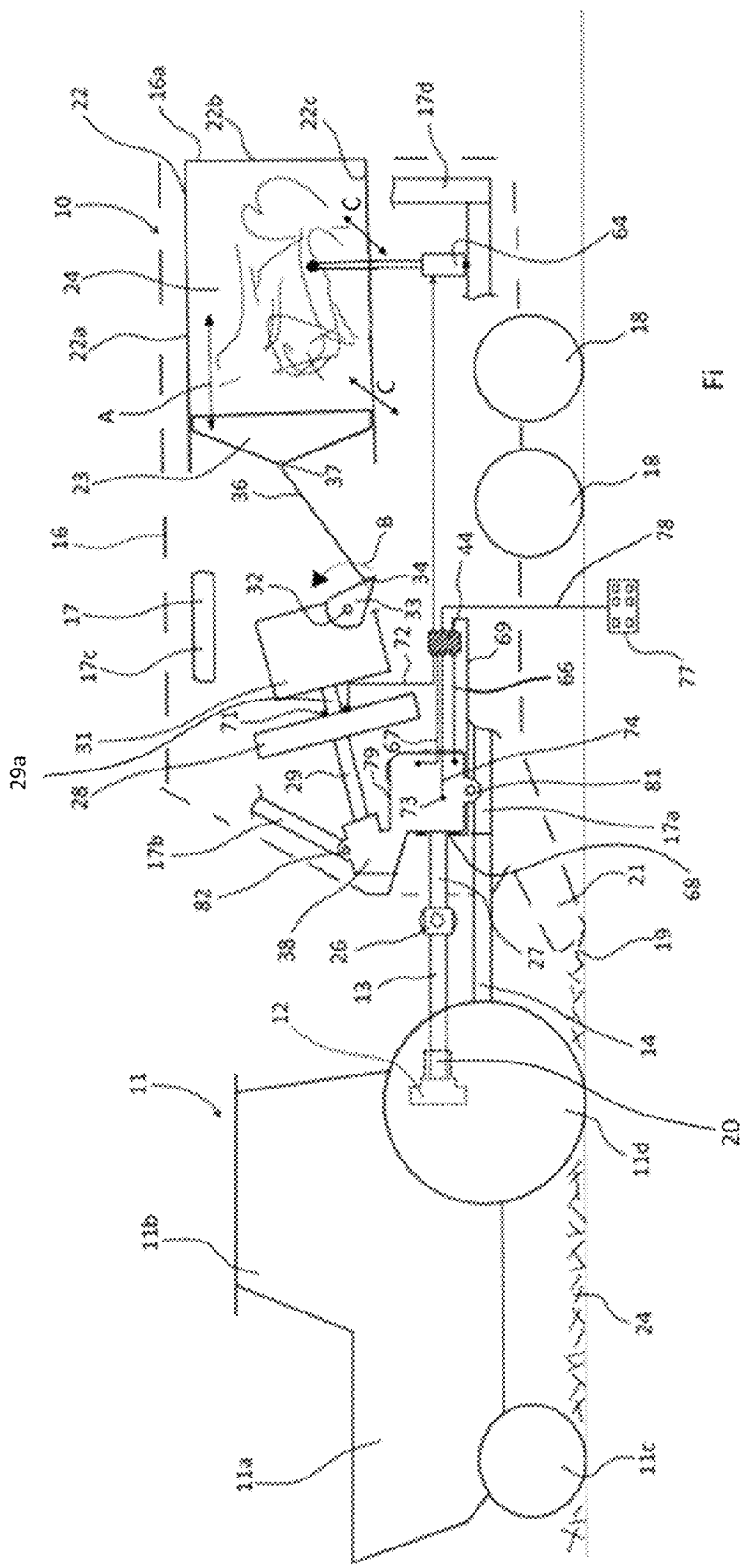
FIG. 1 is a schematic representation of an agricultural baling machinery comprising a baler implement and a work vehicle.

Referring to the drawings, an agricultural baler 10 is shown being towed behind an agricultural work vehicle (towing vehicle) that in the illustrated embodiment non-limitingly is an agricultural tractor 11.

The tractor 11 is a conventional tractor including a vehicle frame/body 11a, rear-mounted cab 11b, front, steerable, ground-engaging wheels 11c and rear, driven, ground-engaging wheels 11d. Tractor 11 includes at its rear end between the rear wheels 11d a power take-off 12 of a conventional design that includes a rotative coupling for a PTO shaft 13 that extends rearwardly of the tractor 11. The PTO 12 may be engaged to cause rotation of the PTO shaft 13 or disengaged, such that the shaft 13 is not powered to rotate, for example through the operation of a control lever or pushbutton.

The tractor 11 may have any of a range of engine power outputs including but not limited to 200 hp, 300 hp and 400 hp. The agricultural baler 10 is operable when towed by any such tractor 11, without a need for adjustment or modification, for the reasons explained below.

The PTO shaft 13 may be any of a variety of lengths. A relatively short PTO shaft 13 and drawbar 14 (described below) minimises the distance between the pick-up 19 (described below) of the baler 10 and the tractor 10. This provides certain advantages, although in some other respects a longer PTO shaft 13 may provide good adjustment flexibility.

The partial driveline represented by the PTO 12 and PTO shaft 13 may in various types of tractor include a PTO clutch 20 that as described above seeks to protect the engine of the tractor 11 from damage caused e.g. when an excessive loading on the PTO shaft causes engine stalling. The PTO clutch 20 is shown schematically in FIG. 1. It may readily be envisaged by the person of skill in the art and typically would be a one-way clutch of a kind that permits free movement when rotating in one direction, and transfers rotary drive via the PTO shaft 13 when rotating in the opposite direction. Other forms and locations are possible in respect of the clutch 20.

The baler 10, i.e. a baling implement, is secured to the rear of the tractor 11 by way of a drawbar 14 that typically is of an "A"-shape when viewed in plan and extends forwardly of the baler 10 below the PTO shaft 13. The drawbar 14 is pivotably secured to a conventional towing hitch at the rear of the tractor 11.

The baler 10 includes a housing or cover 16 that may take a variety of forms. The housing 16 in most baler designs includes a section 16a that is open to permit ejection of formed bales at the rear of the baler 10.

Panels defining the housing 16 further may be openable or removable in order to permit maintenance of the interior parts of the baler 10 replacement of bobbins of twine used for tying completed bales or the clearance of blockages that can arise for a variety of reasons.

The housing 16 of the baler 10 is secured to a baler frame 17 selected parts 17a, 17b, 17c, 17d of which are illustrated in FIG. 1, with the complete frame 17 being omitted for ease of illustration.

The baler 10 is mobile and to this end it includes secured to the frame 17 two or more ground-engaging wheels 18.

In the embodiment illustrated, four wheels are provided, being left and right front wheels and left and right rear wheels 18. In FIG. 1 the left-hand side front and rear wheels are visible.

In this regard the front or forward end of the baler 10 is the end of it that is closest to the towing tractor 11, and the terms "rear", "left", "right", "upper", "lower" and derivative terms are interpreted accordingly and as though an observer is looking forwardly along the baler 10.

The wheels 18 may be mounted relative to the frame 17 by way of suspension components and passive or active steering components as would be known to the person of skill in the art, or they may be mounted more simply. The wheels 18 optionally may include tyres and/or gripping elements that are omitted from FIG. 1 for ease of viewing.

A pick-up 19 projects forwardly of the baler 10 and is arranged to collect cut plant matter 24 lying in a field in which the baler 10 moves as influenced by the motion of the tractor 11. The pick-up 19 passes the plant matter to a conveyor 21. The conveyor 21 conveys the plant matter inside the baler 10 where it undergoes baling.

Numerous designs of pick-up 19 and conveyor 21 are known in the baler art and fall within the scope of embodiments disclosed herein. The precise designs of the pick-up 19 and conveyor 21 are essentially immaterial to the nature and operation of the disclosure, and therefore are not described in detail.

As mentioned, the baler 10 includes an internal bale-forming chamber 22. This is an elongate, cuboidal volume defined by chamber walls of which top and bottom walls 22a and 22c are visible in FIG. 1. The bale-forming chamber 22 in a typical baler design extends in a fore and aft direction in an upper part of the rear of the volume enclosed by the housing 16.

The rear 22b of the bale-forming chamber coincides with the aforementioned open housing section 16a in order to allow ejection of completed bales in a per se known manner.

A crop flow path exists inside the baler 10 between the conveyor 21 and the bale-forming chamber 22. The crop flow path may readily be envisaged and is omitted from the figures for clarity.

The forwardmost end of the bale-forming chamber 22 is essentially open. A plunger 23 occupies the interior cross-section of the bale-forming chamber 22 and is constrained to move longitudinally inside the chamber 22 from the open, forward end towards and away from the rear 22b of the bale-forming chamber 22 as signified by arrow A.

The PTO shaft 13 as mentioned may be powered to rotate, in virtually all tractors in a clockwise direction when viewed from behind the tractor 11. PTO shaft 13 is connected by way of at least one, and in practice at least two, universal joint 26 to the forwardmost end of a rotary input shaft 27 of the baler 10. The universal joint 26 in a well-known manner accommodates changes in the relative orientation of the tractor 11 and baler 10 that result from towing of the baler from place to place, e.g. while the baler is working or when it is travelling between fields.

The input shaft 27 is supported e.g. using journal bearings that are omitted from FIG. 1 for ease of viewing and connects by way of a driveline, described in more detail below, to a rotatable flywheel 28.

The flywheel 28 is supported on a flywheel shaft 29 that also is supported using journal bearings, or a functionally similar arrangement, that further is omitted from FIG. 1. The functions of the flywheel 28 are as described above, although as explained it is possible for the flywheel 28 in embodiments of the disclosure to be made considerably lighter than some prior art flywheels.

The rear end 29a of the flywheel shaft 29 is a rotary input to a drive converter 31 or similar transmission that by way of intermeshing gear components alters the axis of rotation of rotative energy in the baler 10. This drive converter 31 may be referred to as a main transmission in some examples.

The nature of the drive converter 31 thus is such that the longitudinally extending (with reference to the elongate length of the baler 10 as illustrated) axis of rotation of the flywheel shaft 29 becomes rotation about a transversely extending axis of a crankshaft 32.

The crankshaft 32 is connected to a pair of crank members (only the right one is shown as 33) that protrude from the drive converter 31 in a manner presenting free ends. The pair of crank members and corresponding conrods (only the right one shown as 36) connect the crankshaft 32 of the drive converter 31 with the forward side of the plunger 23. A first, right side crank member 33 has a first end connected to the crankshaft 32 of the drive converter 31. A second end of the first, right side crank member 33 is connected to a first end 34 of a first, right side conrod 36. The first, right side conrod 36 has a second end 37 connected to the plunger 23. A second, left side crank member (not shown) has a first end connected to the crankshaft 32 of the drive converter 31. A second end of the second, left side crank member is connected to a first end of a second, left side conrod (not shown). The second, left side conrod has a second end (not shown) connected to the plunger 23.

As is apparent from FIG. 1, therefore, rotation of crankshaft 32 causes rotation of crank member 33, as signified by arrow B, that gives rise to the rectilinear, reciprocal motion of plunger 23 indicated by arrow A.

In this regard it is somewhat arbitrary whether crank 33 rotates clockwise or anti-clockwise, since reciprocal motion of the plunger 23 may in an appropriately designed set of driveline elements be achieved regardless of the direction of rotation of the crank 33. The actual rotational direction of the crank 33 would be a consequence of the internal design of the drive converter 31. Such aspects are not relevant to an understanding of the disclosure, and therefore are not provided in detail herein.

Charges of plant matter 24 conveyed inside the baler 10 from the conveyor 21 repeatedly are at intervals fed by internal components of the baler 10, that are omitted from FIG. 1 for clarity, into the interior of the bale-forming chamber 22 for compaction by reason of the reciprocal, rectilinear motion (arrow A) of the plunger 23. The feeding of each charge of plant matter 24 is timed to coincide with positioning of the plunger 23 at its retracted, i.e. forward-most position, with the result that the plant matter 24 becomes compressed and compacted by the movement of the plunger 23 into bale form after it has been fed in to the bale-forming chamber 22.

The driveline defined between the input shaft 27 and the flywheel shaft 29 includes a transmission 38 that is described below in relation to FIGS. 2 and 3.

Figure 2:
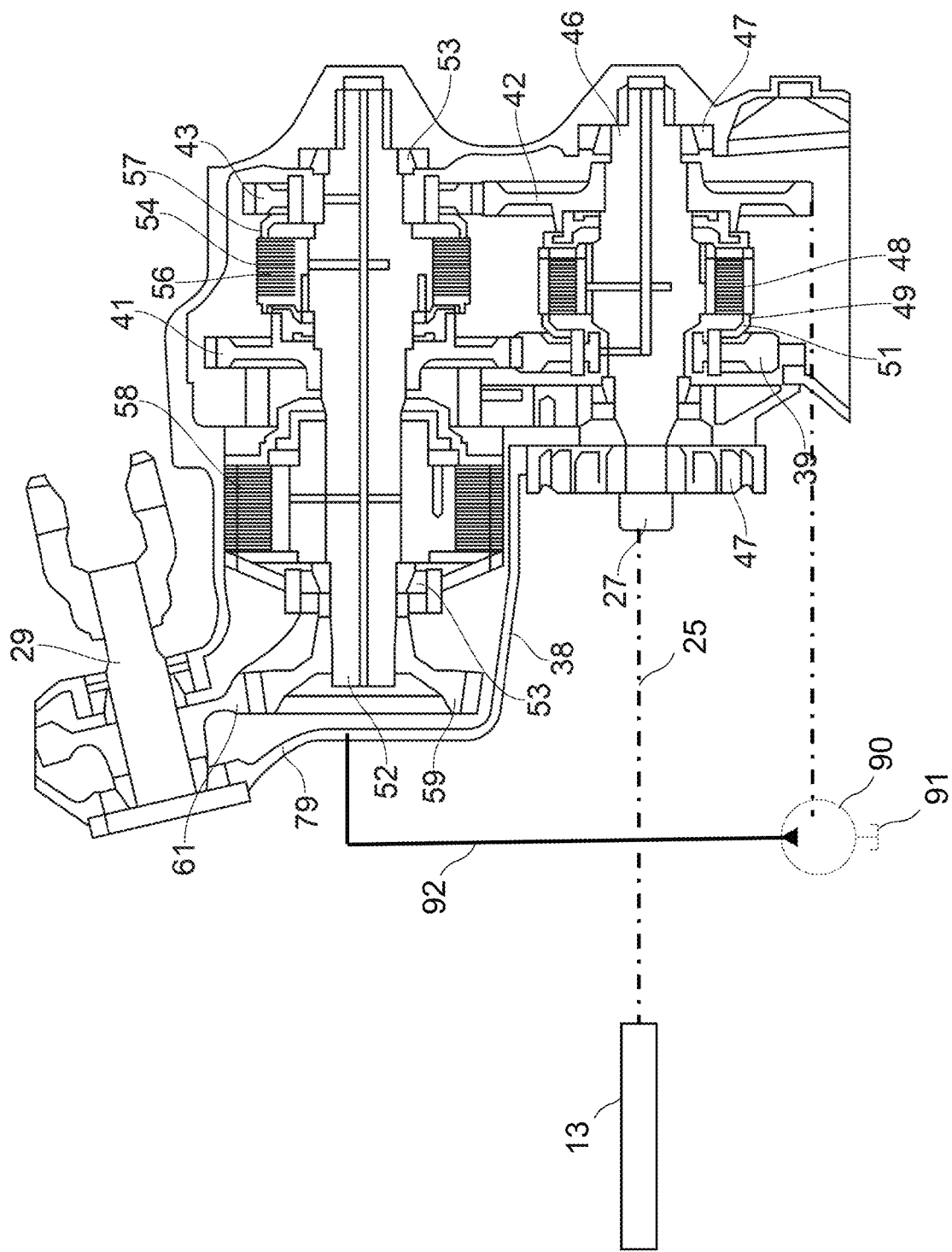
FIG. 2 is a cross-sectional view of a transmission, forming part of the baling machine visible in FIG. 1.
Figure 3:
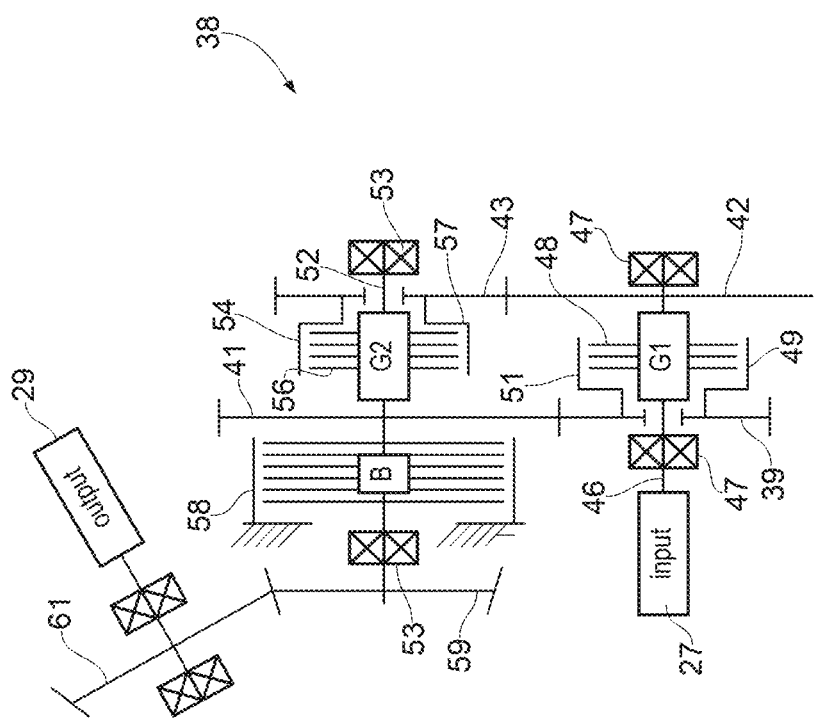
FIG. 3 is a schematic representation of the functionality of the transmission shown in FIG. 2.

In FIGS. 2 and 3, the transmission 38 connects the rotary input shaft 27 to the flywheel shaft 29 at first and second selectable transmission ratios defined by driveline components within the transmission 38.

A first transmission ratio G1 is defined by mutually meshing, rotary, toothed gears 39, 41 that each are supported for rotation within the transmission 38. The first transmission ratio G1 is a relatively great reduction ratio transmission providing a high degree of mechanical advantage.

A second transmission ratio G2 is defined by mutually meshing, rotary, toothed gears 42, 43 that each are supported for rotation within the transmission 38 adjacent the gears 39, 41 in a manner defining a parallel driveline that representing the first transmission ratio G1. The second transmission ratio G2 is a relatively close reduction ratio transmission providing a higher speed of output shaft rotation than the first transmission ratio G1.

The agricultural baling system includes a control unit 44, non-limitingly illustrated schematically in FIG. 1, in the form of a programmable microprocessor. In the embodiment of FIG. 1, the control unit is connected to the baler 10, which includes a source of electrical power, for the control unit 44, that in preferred embodiments may take the form of a rotary generator that is driven directly or indirectly by the PTO shaft, although other sources of electrical power including batteries and other storage devices, or other types of generator, are possible. Combinations of electrical power sources furthermore are possible.

As indicated, the control unit may take a variety of forms and need not be a control unit as illustrated, or a single component. The control unit may also be arranged on the tractor 11 or a remote location, such as a farm control centre, and communicate remotely with corresponding components of the baler.

The baler 10 optionally may include one or more input devices 77, represented schematically and non-limitingly in FIG. 1, by means of which information on the energy transmitted via the power take-off shaft 13 may be input to the control unit 44.

In FIG. 1 an input device 77 is shown in the form of a keypad connected to the control unit 44 via an electrical cable 78, and using which e.g. the rated power output of the tractor 11 can be input to the baler 10. The control unit can select a set of decision parameters (such as the preferred speed of plunger 23 at which to transition from the first transmission ratio G1 to the second transmission ratio G2) that are optimised for the input power level.

The input device 77 may take a variety of other forms. These include but are not limited to a code reader that can read a code printed or affixed on part of the tractor 11, e.g. adjacent the PTO; a near-field communications (NFC) device that establishes a communications link with a control unit forming part of the tractor 11 in order to download power output information; or a cable connection between the control unit 44 and a counterpart control unit forming part of the tractor 11.

The transmission 38 in preferred embodiments includes a rigid housing 79 that may be formed e.g. by casting from a metal alloy, especially a high stiffness, lightweight alloy.

As explained the baler 10 includes a number of frame elements 17. The housing 79 may be positioned to interconnect two or more such frame members (e.g. frame members 17a and 17b as non-limitingly illustrated in FIG. 1) in a manner enhancing the stiffness of the frame 17 of the baler 10.

In the illustrated embodiment such interconnection is achieved by way of perforated lugs 81, 82 by means of which the housing 79 is bolted to interconnect two frame members, but as will be apparent to the person of skill in the art such interconnection may be achieved in a variety of alternative ways.

The layout of the components of the transmission 38 inside the housing 79 is such that the driveline components 39, 41 defining the first transmission ratio G1 occupy a first vertically extending distance in the housing 79; and the driveline components 42, 43 defining the second transmission ratio G2 occupy a second vertically extending distance in the gearbox housing, the upper limit of the second vertically extending distance terminating below the upper limit of the first vertically extending distance.

This means that the transmission 38 is compact in the longitudinal dimension of the baler 10, and also that the output of the transmission 38 is connected to the flywheel shaft 29 at a relatively high point in the baler 10. This provides several advantages in terms of transferring drive input via the input shaft 27 to the location of the plunger 23, which as mentioned is located relatively high inside the baler 10.

The control unit 44 is capable (typically but not necessarily as a result of software and/or firmware programming) of selectively engaging the first or the second transmission ratio G1, G2. The arrangement of the components and/or the programming of the control unit 44 prevents the first and second transmission ratios from being selected simultaneously.

As best illustrated in FIGS. 2 and 3, the input shaft 27 rigidly connects to an input gear shaft 46 that is supported (non-limitingly in the embodiment illustrated by way of journal bearings 47 at either end) for rotational movement inside the transmission 38. The input gear shaft 46 is locked to the gear 42 such that the gear 42 always rotates with the input gear shaft 46.

The input gear shaft 46 is also locked to an input side 48 of a first transmission clutch 49 forming part of the driveline. As a result, the input side 48 of the first transmission clutch 49 also rotates with the input gear shaft 46.

The first transmission clutch 49 is e.g. electrically or electro-hydraulically activated in the described embodiment, and is selectively engageable under command from the control unit 44. When engaged the output side 51 of the first transmission clutch 49 is locked to the input side 48 and rotates therewith.

The output side 51 of first transmission clutch 49 is locked to the gear 39 of the first transmission ratio G1 such that the gear 39 rotates with the output side 51.

In the illustrated embodiment, the first transmission clutch 49 lies on the first gear shaft 46 intermediate the gears 39 and 42, but as will occur to the person of skill in the art this need not be the case, and other clutch and gear position combinations are possible.

As explained, the gears 42 and 43 are mutually meshed, with the gear 43 supported on the rotational intermediate gear shaft 52. The intermediate gear shaft 52 is supported (in the non-limiting example shown by way of journal bearings 53 at either end) for rotation relative to the remainder of the transmission 38.

By reason of locking of the input gear shaft 46 to the gear 42, the gear 43 rotates whenever the input gear shaft 46 rotates, at a speed, relative to the speed of the input gear shaft 46, determined by the gear tooth ratio between the gears 42 and 43. However, the gear 43 merely idles unless a second transmission clutch 54, which may be of a similar design to the first transmission clutch 49 and hence operable under command of the control unit 44, is engaged.

In this respect, the intermediate gear shaft 52 is locked to an input side 56 of a second transmission clutch 54; and an output side 57 is locked to the gear 43. As a result, when the clutch is engaged, rotation of gear 43 is transmitted via the intermediate gear shaft 52.

The gear 39 is meshed with the gear 41 as explained. The gear 41 is locked to the intermediate gear shaft 52. Clearly, therefore, to avoid locking up of the transmission it is essential that only one of the transmission clutches 49, 54 is engaged at a time. When the first transmission clutch 49 is engaged and the second transmission clutch 54 is disengaged, drive from the input shaft 27 is transmitted via the meshed gears 39 and 41 to drive intermediate gear shaft 52 in accordance with the first, reduction transmission ratio "G1" determined by the numbers of teeth of gears 39 and 41. At this time, the gears 42 and 43 rotate in an idling manner.

When the first transmission clutch 49 is disengaged and the second transmission clutch 54 is engaged, the drive of the input shaft 27 is transmitted via the gears 42 and 43 to the drive intermediate gear shaft 52 in accordance with the second transmission ratio "G2" determined by the numbers of teeth of the gears 42 and 43.

As explained herein, the first transmission ratio G1 is a reduction ratio, in which the speed ratio exceeds 1. This provides a beneficial mechanical advantage when moving the flywheel 28 from rest. The second transmission ratio G2, is an acceleration ratio, the speed ratio of which is a value less than 1. This causes rotation of the flywheel shaft 29 to be at a higher speed than that of the PTO shaft 13. As will be described in more detail below, the first and the second transmission ratios G1, G2 will have opposite speed ratios, when the baler is operated in its second state.

It is possible for both the clutches 49, 52 to be disengaged simultaneously. In that case gears 42 and 43 would rotate, but no drive would be transmitted to intermediate gear shaft 52.

The intermediate gear shaft 52 includes, mounted thereon, a brake 58 that may be employed when both the transmission clutches 49, 52 are disengaged to slow the flywheel shaft 29, e.g. during the second state of the baler. The flywheel shaft 29 receives the rotary drive of intermediate gear shaft 52, when one of the transmission clutches 49, 54 is closed, via meshed output gears 59, 61.

The numbers of teeth of the gears 39, 41, 42, 43, 59 and 61 may be varied extensively in all the gears of the transmission 38 depending on the precise design of the transmission 38. The overall numbers of drive-transferring components in the transmission may be varied. Also as explained the driveline elements defining the transmission ratios need not be meshing, toothed gears and instead may adopt a range of other forms, including but not limited to the examples given above.

The transmission clutches 49 and 54 may be for example electrically (e.g. solenoid) operated, electro-mechanically operated or electro-hydraulically operated, under the control of the control unit 44. Preferably, but not essentially, the transmission clutches 49, 54 are spooled wet clutches the nature of which is familiar to the person of skill in the art and therefore does not require describing in detail herein. Wet clutches generally are highly suitable for computer or other electronic control, leading to rapid clutch engagement and disengagement.

One form of control of the transmission clutches 49, 54 is by electrical control-signals transmitted from the control unit 44 to the first and second transmission clutches 49, 54. One form of control of the transmission clutches 49, 54 is illustrated schematically by electrical control-signal line 66 (FIG. 1) that transmits commands from the control unit 44 to first transmission clutch 49; and control line 67 that transmits commands from the control unit 44 to second transmission clutch 54.

Two-way communication between the transmission clutches 49, 54 and the control unit 44 optionally is possible. Using two-way control, the transmission clutches 49, 54 can signify e.g. their operational (i.e. engaged or disengaged) status, information on the condition of wear parts such as friction plates, levels of clutch fluid in the event of the clutches being wet clutches as is preferred and similar operational variables. The control unit 44 can generate commands and/or warning signals in dependence on the signals received from the transmission clutches 49, 54.

The control unit 44 may further be connected to a rotational speed sensor 68 and/or an oil temperature sensor 73 via electric signal line 74.

The control unit 44 is capable of selectively disengaging the rotary drive between the input shaft 27 and the shaft 29 supporting the flywheel 28. This possibility is explained further below in connection with operational sequences made possible by the apparatus of the present disclosure. The control unit 44 may also be capable of selectively activating the brake 58 of the transmission 38. Activation of the brake 58 will actively slow the rotational speed of the flywheel shaft 29 and thus the speed of the flywheel 28 connected to the flywheel shaft 28.

As will be appreciated, the first and second clutches 49, 54 and the brake 58 may each be considered to be heat generating components. The clutches 49, 54 may typically generate large amounts of heat during the engagement process, i.e. when being transferred between their fully engaged and disengaged states. The brake may generate large amounts of heat when activated. In order to avoid excessive temperature rises and resulting heat damage, the baler 10 comprises at least one pump 90 for providing cooling and/or lubrication flow to the heat generating components of the baler 10, e.g. the first and second clutches 49, 54 and the brake 58. The pump 90 may be referred to in the following as a cooling pump. However, it should be noted that the fluid flow provided by the pump 90 may, at the same time, act to lubricate the movable components of the baler, such as the clutches 49, 54 and the brake 58.

The cooling pump 90, schematically illustrated in FIG. 2, is for providing cooling/lubrication fluid flow to heat generating parts of the baler driveline. It should be appreciated that the hydraulic schematic of FIG. 2 is heavily simplified, e.g. by removing the return lines for the hydraulic fluid flow provided by the pump 90.

The cooling pump 90 is arranged on the baler 10 such that it is driveable by means of the PTO shaft 13. To this end, the cooling pump 90 may either be directly or indirectly connected to the PTO shaft 13. In one embodiment, the hydraulic pump 90 is connected to and driven by the input shaft 27. The input shaft 27 is, in turn, connected to the PTO shaft 13 via driveline components 25 that are only schematically illustrated in FIG. 2.

In the example of FIG. 2, the cooling pump 90 may be directly connected to the gear 42 that is permanently connected to the input shaft 27. A drive shaft of the pump 90 may be connected to one or more driven gears (not shown), which are in meshing contact with and driven by the sprockets of the gear 42. Of course, other pumps, such as shift pumps etc., could also be connected to the input shaft. In some embodiments, a shift pump is connected to the same drive shaft as the cooling pump 90 shown in FIG. 2.

The cooling pump 90 is arranged to provide cooling fluid flow from a reservoir 91 to the inside of the transmission housing 79, and particularly towards heat generating components of the transmission 38, such as the first and second clutches 49, 54 and the brake 58, as will be described in more detail below.

Heat generating components referred to in this specification may generally be any component within the baler driveline that will generate amounts of heat during normal operation that require the provision of cooling fluid flow to reduce wear and other heat damage. The following description will refer to the first and second clutches 49, 54 as well as the brake 58 as examples of heat generating components within the driveline. However, it will be understood that the baler system of the present disclosure is not restricted to such specific examples of heat generating components.

The control unit 44 may be connected to a variety of control valves for selectively providing the coolant flow of the cooling pump 90 for cooling the heat generating component of the baler 10.

Figure 4:
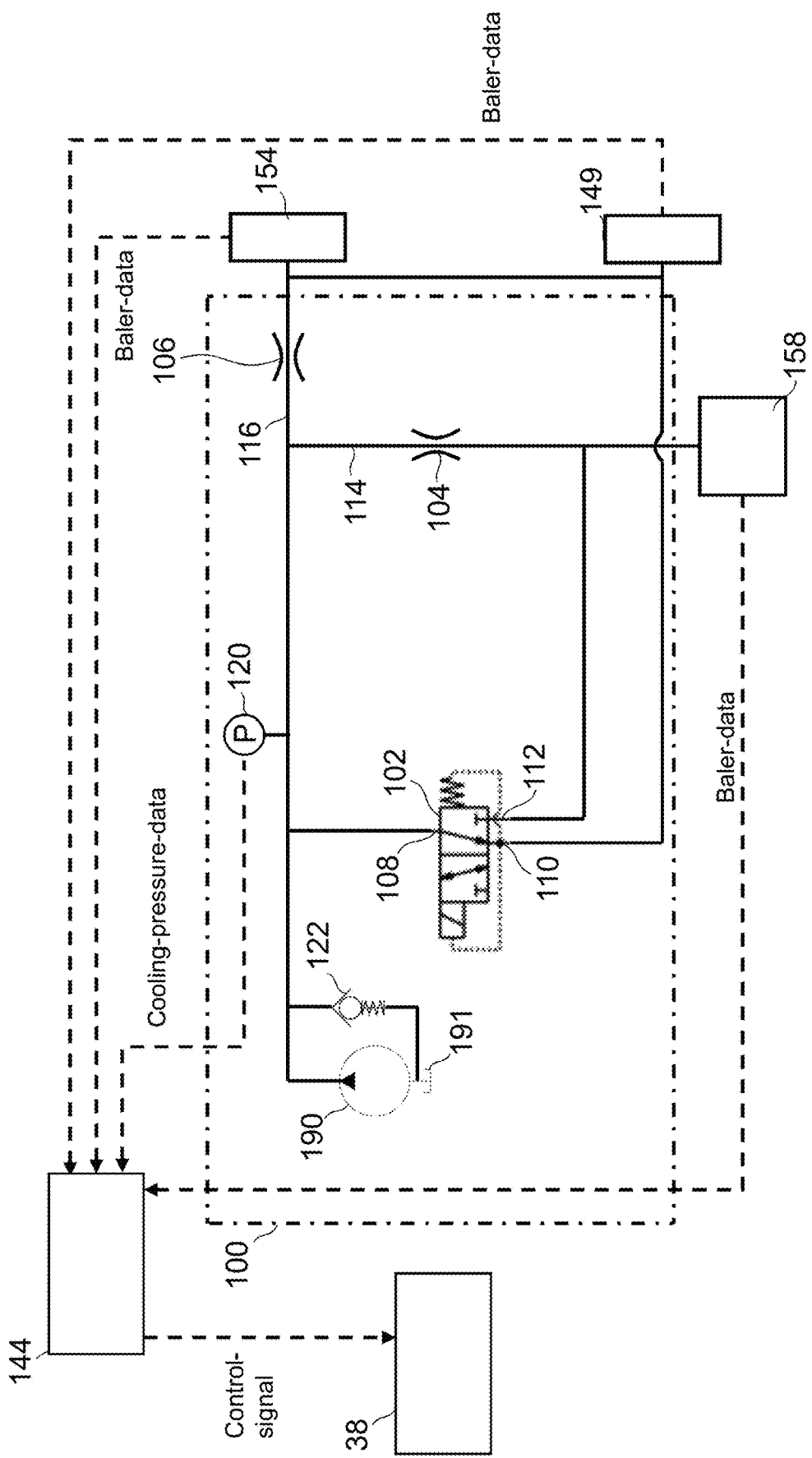
FIG. 4 is a hydraulic schematic of parts of a fluid supply circuit forming part of the baling machine visible in FIG. 1.

Turning to FIG. 4, there is shown a first embodiment of a hydraulic fluid supply circuit 100 for supplying cooling fluid flow to heat generating components of the agricultural baler. The cooling fluid supply circuit 100 may be arranged on the agricultural baler 10. In alternative embodiments, the cooling fluid supply circuit may be arranged on the corresponding work vehicle, such as the tractor 11 shown in FIG. 1.

The cooling fluid supply circuit 100 comprises a cooling pump 190 that includes a first port connected to a cooling fluid reservoir 191. An outlet port of the cooling pump 190 is connected to a directional control valve 102 as well as first and second flow control components 104, 106.

The directional control valve 102 may be a three/two-way valve. An inlet port 108 of the directional control valve 102 is connected to the outlet port of the cooling pump 190. The directional control valve 102 includes a first outlet port 110 and a second outlet port 112. In a first position of the directional control valve 102, the inlet port 108 is connected to the first outlet port 110. In a second position of the directional control valve 102, the inlet port 108 and the second outlet port 112 are connected. The first outlet port 110 is connected to first and second heat generating components 149, 154, such as the first and second clutches 49, 54 discussed with reference to FIGS. 2 and 3. The second outlet port 112 of directional control valve 102 is connected to a third heat generating component 158, such as the brake 58 discussed with reference to FIGS. 2 and 3.

The first and second flow control components 104, 106, in their simplest form, may be throttles for reducing the amount of flow provided to the heat generating components 149, 154, 158 by the cooling pump 190. Alternatively, the first and second flow control components may be any other flow reducing devices, such as pressure-compensated flow control valves, etc.

The first flow control component 104 may reduce hydraulic fluid flow provided to the third heat generating component 158 via a fluid line 114. The second fluid flow control component 106 may reduce the amount of fluid flow provided by the cooling pump 190 to the first and second heat generating components 149, 154 via a fluid line 116.

Fluid flow provided to the first and second heat generating components 149, 154 via the first outlet port 110 of directional control valve 102 is generally unrestricted, in this example. The fluid flow provided to the third heat generating component 158 via the second outlet port 112 of the directional control valve 102 is also substantially unrestricted, in this example.

The cooling fluid supply circuit 100 shown in FIG. 4 generally comprises two states. In a first state, when the directional control valve 102 is in its first position (shown in FIG. 4), a first, higher cooling fluid flow rate is provided to the first and second heat generating components 149, 154, via the first outlet port 110 of the directional control valve 102. This is because the fluid flow bypasses the second flow control component 106 in the first state. The same amount of cooling fluid flow will be provided to both the first and second heat generating components 149, 154. No cooling fluid flow will be provided to the third heat generating component 158 via the directional control valve 102, when the fluid supply circuit 100 is in its first fluid supply mode. However, a reduced amount of fluid flow will still be provided to the third heat generating component 158, when the fluid supply circuit is in its first fluid supply mode. In detail, hydraulic fluid flow provided by the pump 190 is provided to the third heat generating component 158 via the fluid line 114 that connects the first flow control component 104 to the third heat generating component 158, in the first state. Cooling fluid flow provided to the third heat generating component 158 via the first flow control component 104 is supplied at a second cooling fluid flow rate. The second cooling fluid flow rate is lower than the first cooling fluid flow rate that is supplied to the first and second heat generating components 149, 154, in the first fluid supply mode of the fluid supply circuit 100. In one example, the first flow control component 104 may be sized such that the second cooling flow rate is sufficient for lubrication of the third heat generating component 158.

In a second fluid supply mode of the cooling fluid supply circuit 100, the directional control valve 102 shown in FIG. 4 is transferred to its second position (i.e. shifted to the right in FIG. 4), such that the inlet port 108 and the second outlet port 112 of the directional control valve 102 are connected. Therefore, in this second fluid supply mode of the cooling fluid supply circuit 100, substantially unrestricted fluid flow is provided from the pump 190 to the third heat generating component 158 via the directional control valve 102, whereas restricted fluid flow is provided to the first and second heat generating components 149, 154 via the second flow control component 106. This is because the fluid flow bypasses the first flow control component 104 in the second state. Accordingly, the third heat generating component 158 is provided with a high, first cooling fluid flow rate, whereas the second and third heat generating components 154, 149 are provided with a lower, second cooling flow rate via the second fluid flow control component 106.

FIG. 4 further shows a control unit 144, such as the control unit 44 of the baler 10 shown in FIG. 1. The control unit 144 is configured to receive baler-data that is indicative of one or more operating conditions of the agricultural baler. Examples of baler-data received by the control unit 144 will be explained in more detail below. On the basis of the baler-data, the control unit sets a threshold-condition that is compared to cooling-pressure-data provided to the control unit 144. The cooling-pressure-data is indicative of the cooling fluid flow provided by the at least one pump.

It will be appreciated that cooling fluid pressure provided by the cooling pump 190 will result in a cooling fluid flow to the heat generating components 149, 154, 158. The cooling fluid pressure may be determined by a pressure sensor 120. The cooling fluid pressure measurements taken by the pressure sensor may be transferred to the control-unit as cooling-pressure-data.

The pressure sensor 120 may be connected to the outlet port of the cooling pump 190. In one embodiment, the cooling fluid pressure provided by the hydraulic cooling pump 190 may be limited to a maximum-pressure-value, for example by means of a pressure relief valve 122. In one example, the maximum-pressure-value may be set to around 5 bar by the pressure relief valve. In normal operation, it is expected that the cooling pump 190 provides sufficient amounts of fluid flow to achieve the maximum-pressure-value of, for example, 5 bar throughout the operation of the baler. However, in some situations, the cooling pressure may drop below the expected maximum-pressure-value. In some examples, the pump 190 can be driven by the input shaft 27 of the transmission 38. If there is a one way clutch in between the input shaft 27 and the PTO shaft 13, then the input shaft 27 can still drive the pump 190 even when the PTO is shut off. In one example, the cooling pressure within the system may drop when the PTO shaft speed decreases temporarily or permanently. This can be because a decrease in PTO shaft speed may coincide with a decrease in hydraulic fluid flow and hence cooling pressure provided by the hydraulic cooling pump 190.

Existing agricultural systems may shut-down the agricultural baler 10 if the cooling fluid pressure provided by the pump 190 drops below the expected pressure level. In other words, existing machinery may shut-down the baler if the cooling fluid pressure within the cooling fluid system (which may also be referred to as a lubrication/cooling circuit) drops below a threshold that is equal to the maximum-pressure-value discussed above (e.g. 5 bar).

The control unit 144 of the present disclosure is configured to adjust certain threshold-conditions, such as a threshold-pressure-value against which the cooling fluid pressure may be compared, on the basis of one or more operating conditions of the agricultural baler.

The control unit is configured to receive baler-data that is indicative of one or more of the operating conditions of the agricultural baler. The present disclosure appreciates that the agricultural baler is more prone to heat damage in some operating conditions of the baler than others. In other words, the control unit is configured to receive baler-data that is indicative of operating characteristics that affect the temperature of the baler. Depending on such operating conditions of the agricultural baler, the control unit may set various threshold-conditions that may not be exceeded without causing heat damage to the baler. The threshold-conditions are dynamically determined by the control unit and dependent on the operating conditions of the agricultural baler. Depending on the expected heat generated in certain conditions of the agricultural baler, the control unit may determine safety threshold-conditions to avoid heat damage within the agricultural baler.

Examples of the baler-data received by the control unit that are indicative of one or more operating conditions of the agricultural baler include: driveline-data indicative of a current activation status of the heat generating components within the driveline, and cooling-fluid-data indicative of the status of the cooling fluid provided to the heat generating components. The baler-data received by the control unit may include various other data that is indicative of either heat generated at a particular time of the baler operation or the ability of the baler's cooling system to dissipate such heat. Depending on such baler-data, the control unit will determine threshold-conditions, e.g. minimum cooling requirements to avoid heat damage within the baler.

In one example, the baler-data received by the control unit 144 may include driveline-data indicative of a current activation status of at least one of the heat-generating components 149, 154, 158. As mentioned above, the heat-generating components 149, 154, 158 may produce varying amounts of heat depending on their current activation status. For example, during activation of the third heat generating component 158, such as the brake 58 discussed with reference to FIGS. 2 and 3, large amounts of heat are generated. This may trigger the control unit 144 to set a threshold-pressure-level for the cooling fluid pressure to higher values than in a situation in which the third heat generating component 158 is inactive and less heat is produced as a result.

It follows that the baler-data, in this example, may be indicative of current or future amount of heat generated within the driveline.

Exemplary driveline-data may include input-power-data such as a PTO speed provided to the input shaft of the baler (input-shaft-speed-data). The control-unit can use the PTO speed to determine a current or future engagement of the heat generating components (e.g. the first clutch 49) and then determine an appropriate threshold-condition, such as the threshold-pressure-level mentioned above. In this regard it will be appreciated that the first clutch will usually start engaging when the PTO speed has reached a desired PTO-speed-threshold. The control unit of this embodiment may thus set the threshold-condition on the basis of a comparison of PTO-speed-data with the above PTO-speed-threshold.

Optionally, the control unit can process the input-shaft-speed-data to calculate clutch-slip-data that indicates how much slip is occurring in a clutch in a gearbox (such as the transmission 38 that is described above). For instance, the control unit can also receive the following types of driveline-data: clutch-pressure-data that represents the pressure of clutch fluid in the clutch, and flywheel-shaft-speed-data that represents that speed of the flywheel shaft. The pressure of the clutch fluid in the clutch can be equivalent to a certain torque. Therefore, the control unit can determine the heat generated in the clutch as: Power dissipated as heat=Torque*Angular speed difference. Where Angular speed difference=input-shaft-speed-data−flywheel-shaft-speed-data.

Another example of driveline-data is operator-command-data that represents an instruction that an operator has provided to the agricultural system. For instance the operator may provide an instruction to a user interface, such as using a touchscreen in the cab of the tractor. In one example, the operator-command-data may represent a user initiating a start-up routine or other predetermined routine of the baler. The control-unit can use the operator-command-data to determine a current or future engagement of the heat generating components in order to determine an appropriate threshold-condition.

Other driveline-data may comprise transmission-control-signals, such as a transmission-control-signal provided to a clutch control circuit (e.g. a fluid supply circuit) for engaging/activating the heat generating components 149, 154. Also, the transmission-control-signal can be provided to a brake control circuit (e.g. a fluid supply circuit) for engaging/activating the heat generating components 158. Therefore, the transmission-control-signal may be a clutch-pressure-signal and/or a brake-pressure-signal. Such clutch-pressure-signals and brake-pressure-signals may be provided by pressure sensors, or may be provided in response to control signals that are provided by a control unit. The control unit 144 can set a suitable threshold-condition on the basis of such transmission-control-signals.

Further examples of driveline-data can include: actuation-pressure-data indicative of a hydraulic fluid pressure that is applied to the at least one heat generating component 149, 154, 158 for actuation; and position-data indicative of movement of the heat generating components 149, 154, 158.

Moreover, the driveline-data may include engagement-data received from a position sensor provided on the heat generating components 149, 154, 158, such as the clutches 49, 54 and/or the brake 58, to determine whether the heat generating components 149, 154, 158 are engaged/active. The position sensor may be an optical sensor that provides binary engagement-data to the control unit. The control unit may be configured to look-up or calculate a suitable threshold-condition on the basis of the engagement-data.

The baler-data may also include cooling-fluid-data indicative of a status of the cooling fluid provided to the at least one heat generating component. The cooling-fluid-data may comprise data relating to the temperature of the cooling fluid, e.g. fluid-temperature-data. It will be appreciated that the higher the temperature of the cooling fluid, the more cooling fluid pressure will be required to achieve the necessary cooling fluid flow for adequately dissipating the heat at any given time of the baler operation. Similarly, cold cooling fluid may be able to dissipate sufficient amounts of heat even at lower cooling fluid flows, e.g. below the maximum-pressure-value mentioned above. The control unit may compare the fluid-temperature-data to a temperature-threshold. On the basis of the comparison result, the control-unit may set the threshold-condition.

In another example, the baler-data may include cooling-pressure-data, which is indicative of the pressure of the cooling fluid. As will be discussed below, the pressure of the cooling fluid (and the difference between a current pressure and an intended pressure), can be used to set a threshold-duration. Higher cooling pressure can cause higher cooling flows, and thus better cooling. Therefore, the cooling-pressure-data can be used to determine how long a component should be cooled for.

The cooling-fluid-data may also comprise data relating to the viscosity of the cooling fluid. Highly viscose cooling fluid will result in higher cooling fluid pressures and lower cooling fluid flow provided to the heat generating components 149, 154, 158. The control unit may thus change the threshold-condition if the cooling-fluid-data indicates that the cooling fluid has a high viscosity. To this end, the control-unit may be provided with cooling-fluid-data comprising cooling-fluid-viscosity-data. The control unit may compare the cooling-fluid-viscosity-data to a viscosity-threshold. On the basis of the comparison result, the control-unit may set the threshold-condition.

The cooling-fluid-data may comprise data relating to the service time, i.e. service-time-data, of the cooling fluid. Cooling fluids that have been used for long periods of time may exhibit less favourable heat dissipation characteristics than unused cooling fluids Accordingly, the control unit may determine the threshold-conditions on the basis of a comparison of the service-time-data with a service-time-threshold.

Also, the cooling-fluid-data may comprise data relating to the type of the cooling fluid. For example, the type of an oil that is used as the cooling fluid.

Figure 5:
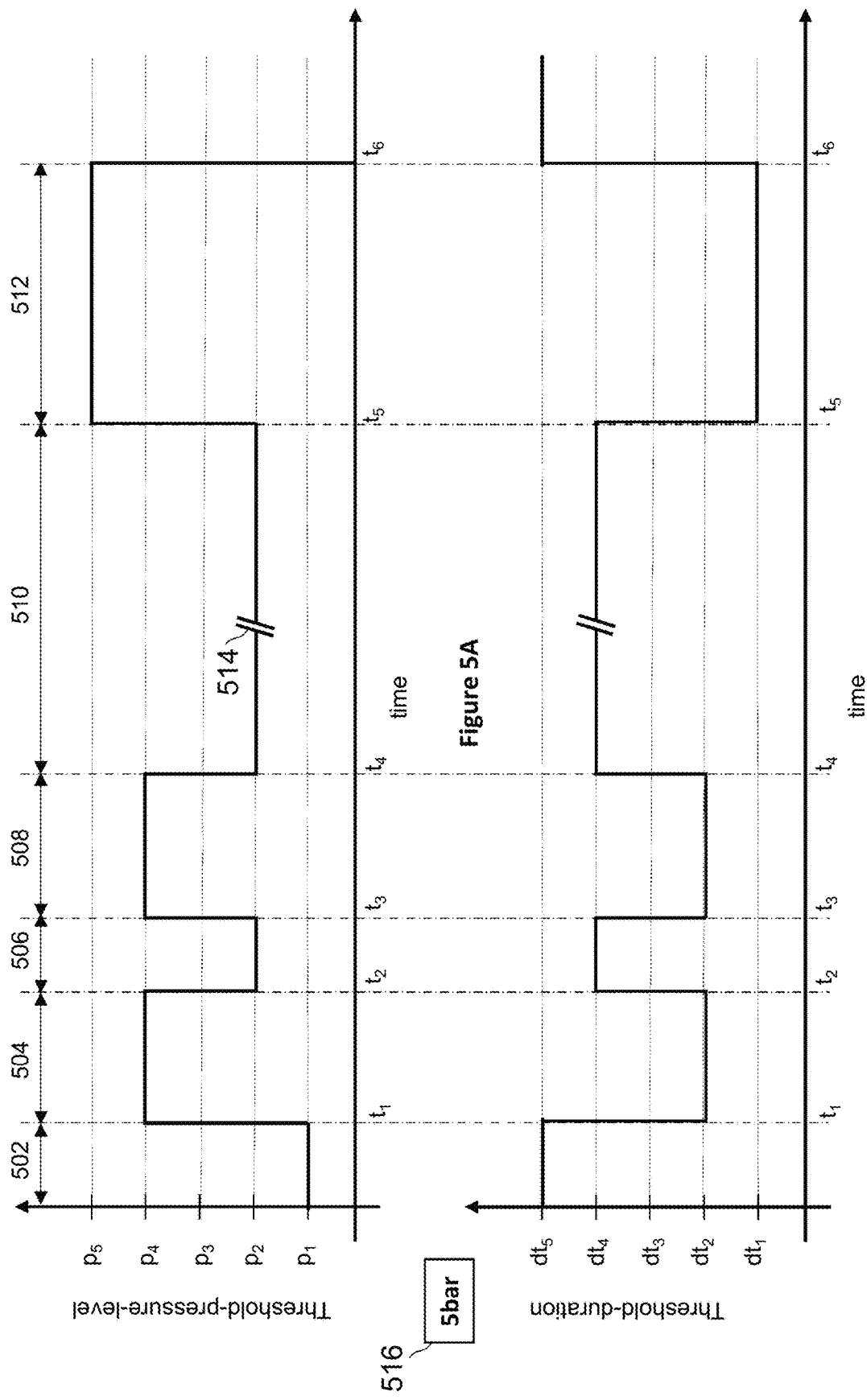
FIG. 5A is a schematic profile illustrating a method of dynamically setting a threshold-pressure-level on the basis of baler-data.
FIG. 5B is a schematic profile illustrating a method of dynamically setting a threshold-duration on the basis of baler-data.

Turning to FIG. 5A, there is shown one embodiment of the present disclosure, in which the threshold-condition comprises a threshold-pressure-level. The threshold-pressure-level may be representative of a cooling fluid pressure expected to be available in the fluid supply circuit. As mentioned before, conventional systems will expect a constant cooling fluid pressure of 5 bar for the entire operation of the baler. By contrast, the control unit 144 of the present disclosure is configured to dynamically change the expected cooling fluid pressure depending on one or more operating conditions of the agricultural baler. In other words, the control unit 144 of the present disclosure will set a threshold-pressure-level on the basis of the baler-data. In the example of FIG. 5A, the baler-data is a driveline-data that is indicative of an activation status of the heat generating components.

Various exemplary threshold-pressure-levels are shown in FIG. 5A, during different stages of the baler operation. Generally, the control unit 144 may be configured to change the threshold-pressure-level depending on the expected amount of heat generated at any one time during the baling process.

In FIG. 5A, a first stage 502 of the baling process may be a period of time between starting of the tractor engine and engagement of the first clutch. During this first stage 502, the PTO shaft provides input power to the input shaft 27, such that the input shaft 27 as well as gears 41 and 42 rotate. However, neither one of the clutches 49, 54 is engaged and the brake 58 is not activated. It follows that, at this first stage 502, only very little heat is generated, which may not require cooling fluid pressures equal to the maximum-pressure-value discussed above. Of course, it will be appreciated that the maximum-pressure-value available in any cooling system may vary significantly. In FIG. 5A, the maximum-pressure-value to which the fluid supply circuit is limited by means of the pressure relief valve is shown as pressure P5.

The control unit 144 may determine on the basis of the baler-data, that the baler is at the first stage 502. At the first stage 502, i.e. before the first clutch 49 is engaged, little heat is generated, such that the control unit 144 may set the threshold-pressure-level to a value $p_1$ (e.g. 1 bar), which is significantly lower than the maximum-pressure-value $p_5$. It follows that, for as long as the cooling fluid pressure measured by the pressure sensor 120 does not fall below the threshold-pressure-level $p_1$ during the first stage 502, no heat damage is expected. In other words, if, for example, the set threshold-pressure-level of stage 502 is around 1 bar, then control unit 144 will determine any cooling fluid pressure above 1 bar as sufficient for cooling the driveline during the first stage 502. It follows that during the first stage 502, the control unit is configured to accept cooling fluid pressure values of the cooling-pressure-data received from the pressure sensor 120 that are below the maximum-pressure-value $p_5$ and above the threshold-pressure-level $p_1$, without taking remedial action, such as stopping the baler. Therefore, advantageously, the control unit would not take any remedial action (such as shutting down the baler) if the cooling fluid pressure value is 3 bar because this is still considered to provide sufficient cooling for the current operational state of the baler. This would be in contrast to a control unit that only used a fixed threshold of 5 bar, in which case the baler could be unnecessarily shut down therefore reducing the efficiency and effectiveness of the baling operation.

In a second scenario 504 shown in FIG. 5A, the agricultural baler may initiate the start-up procedure. In particular, at a time $t_1$ the first clutch 49 of the transmission 38 may start to be engaged. Engagement of the first clutch 49 will significantly increase the amount of heat generated within the transmission 38. Large amounts of heat will be generated until the first clutch 49 is fully engaged at a time $t_2$. The control unit 144 may determine, on the basis of the baler-data, that the baler is at the second stage 504 during which the first clutch 49 is being engaged. On the basis of such baler-data, the control unit 144 may change the threshold-pressure-level compared to the first stage 502. In particular, the control unit 144 may set the threshold-pressure-level during the second stage 504 to a pressure value $p_4$, which is significantly higher than the pressure value pi applied at the first stage 502. In one example, the threshold-pressure-level $p_4$ chosen during the second stage 504 may be just below the maximum-pressure-value $p_5$. Accordingly, the control unit 144 may accept small decreases of the cooling fluid pressure below the maximum-pressure-value for as long as the cooling fluid pressure during the second stage 504 remains above the threshold-pressure-level $p_4$. Alternatively, if during the second stage 504 the cooling fluid pressure within the cooling fluid supply system drops below the threshold-pressure-level $p_4$, the control unit may provide a control-signal to the agricultural baler for avoiding heat damage, such as a shut-down-signal. Alternatively, the control unit may provide a control-signal that reduces the clutch pressure so that the dissipated power is reduced and the reduced cooling pressure is considered adequate, albeit at the expense the clutch engagement taking longer.

At a time $t_2$ the first clutch 49 is fully engaged, which marks the end of the second stage 504. During the fully engaged state of the first clutch 49, that is during a third stage 506 starting at time $t_2$, only comparatively little heat is generated within the baler. The control unit may receive baler-data indicative of the first clutch 49 being fully engaged. On the basis of such baler-data, the control unit may then set the threshold-pressure-level to a pressure level $p_2$ for the duration of the third stage 506, i.e. for as long as the baler-data indicates that the first clutch 49 is fully engaged. It will be appreciated that the threshold-pressure-level $p_2$ is significantly lower than the threshold-pressure-level $p_4$ of the second stage 504. This is because, during the third stage 506, much less heat is generated than during the second stage 504 such that lower cooling fluid pressures provided to the heat generating components are acceptable without risking heat damage to the baler. Similar to the above, the control unit 144 may be configured to only take remedial actions, e.g. send a shut-down-signal to the baler, if the cooling fluid pressure provided to the at least one heat generating component falls below the said threshold-pressure-level $p_2$ during the third stage 506.

At a time $t_3$, the control unit may select the second transmission ratio G2 of the transmission 38 to further increase the speed of the flywheel 28 during the start-up procedure. To this end, at time $t_3$, the control unit disengages the first clutch 49 and starts engaging the second clutch 54 instead. It follows that at a fourth stage 508 of the baling process, the control unit is provided with baler-data, particularly with driveline-data, indicating that the second clutch 54 is currently being engaged. Similar to the engagement of the first clutch 49 during the second stage 504, a large amount of heat is generated during the fourth stage 508. Accordingly, the control unit will set the threshold-pressure-level to a higher value $p_4$ than during the third stage 506. Again, the control unit will only take remedial actions (e.g. by providing the baler with a suitable control-signal) if the cooling fluid pressure provided to the heat generating components during the fourth stage 508 falls below the threshold-pressure-level $p_4$.

At a time $t_4$, the second clutch is fully engaged, and the baler start-up procedure is completed. This marks the beginning of a fifth stage 510, which is for normal baler operation, i.e. when the baler works the field without any unexpected complications. During the fifth stage 510, the second clutch 54 remains engaged, whereas the first clutch 49 and the brake 58 are inactive. The control unit may determine on the basis of the baler-data that the baler is in the fifth stage 510, i.e. that the second clutch is fully engaged. On the basis of such baler-data, the control unit may set the threshold-pressure-level to a new pressure value $p_2$, which is again lower than the pressure value $p_4$ during the fourth stage 508. Similarly, the threshold-pressure-level $p_2$ of the fifth stage 510 may be identical to the pressure-threshold-level $p_2$ applied by the control unit during the third stage 506. It follows that the control unit will only take remedial action during the fifth stage 510 if the cooling fluid pressure supplied to the heat generating components drops below the threshold-pressure-level $p_2$ at any point. As indicated by the broken line 514, the fifth stage 510 is typically significantly longer than any of the other stages described in the example of FIG. 5A. It follows that during most of the baling process, the control unit may accept cooling pressures (and therefore also cooling flows) supplied to the heat generating components that are significantly below the maximum-pressure value of the system (e.g. below 5 bar). In other words, if for some reason during the baling operation in the fifth stage 510 the power provided to the cooling pump decreases and results in a slightly reduced cooling fluid flow supplied to the heat generating components, the control unit may determine that no remedial action is required until the cooling fluid pressure falls below the set threshold-pressure-level $p_2$. In this way the operator lower the PTO speed during this mode of operation, which can lower the available cooling pressure when the baler is fully engaged. Lowering the PTO speed in this way can advantageously reduce the fuel consumption of the tractor engine, and can also reduce the noise generated by the tractor engine, without resulting in any remedial action being taken. This would not be the case if a fixed, higher, threshold were used for the cooling fluid pressure.

The fifth stage 510 shown in FIG. 5A ends at a time $t_5$, at which the brake 58 is activated. This may be because the baling process is completed, i.e. all of the crop on the field has been harvested or an emergency shut down is required. At the time $t_5$, e.g. the start of a sixth stage 512, the baler-data, e.g. the driveline-data, will indicate that the brake 58 is activated. Accordingly, a very large amount of heat will be generated within the transmission 38 such that the control unit will determine or set a threshold-pressure-level that is required to dissipate the amount of heat generated during braking. In the example of FIG. 5A, the threshold-pressure-level $p_5$ is equivalent to the maximum-pressure-value (e.g. 5 bar) of the cooling fluid supply system. In other words, the control unit will set, on the basis of the baler-data indicating that the brake 58 is active, the threshold-pressure-level to the maximum cooling fluid pressure achievable by the cooling fluid supply system. It follows that if the cooling fluid pressure supplied to the at least one heat generating component during the sixth stage 512 falls below the maximum-pressure-value, the control unit 144 will take remedial action, e.g. by providing the baler with a suitable control-signal.

In this sixth stage 512 of the baling operation, remedial action may include using an additional, emergency, cooling fluid supply to increase the cooling fluid pressure and flow temporarily. This is because during the sixth stage 512, the baler is already being stopped, such that an emergency shut down may not suitable. The emergency cooling fluid supply may be provided in the form of an accumulator (not shown) that is selectively connectable to increase the pressure/the amount of flow in the cooling circuit that provides cooling fluid to the heat generating components of the baler. The control unit may provide a control-signal for connecting the accumulator to the heat generating components if the cooling fluid pressure within the system falls below the threshold-pressure-level $p_5$ set for the sixth stage 512.

At a time $t_6$, the flywheel 28 has come to a standstill so that no more heat is generated within the baler.

The above description of FIG. 5A referred to an embodiment in which the control unit dynamically sets the threshold-pressure-level as a threshold-condition to avoid or reduce the likelihood of heat damage within the baler. It should be appreciated that the threshold-pressure-level is not the only threshold-condition that can be dynamically set by the control unit, as will be explained in more detail below.

FIG. 5B shows an embodiment, in which the control unit is configured to set a threshold-duration dynamically on the basis of the baler-data. The threshold-duration may be a threshold-condition that is determined on the basis that insufficient cooling fluid pressure within the system may be tolerated for varying amounts of time (e.g. depending on the operating stages of the baler) before heat damage can be expected. In the example of the transmission 38 described with reference to FIG. 1, it may be that the components of the transmission 38 act as a buffer for excess heat generated in sub-optimal cooling conditions, i.e. when the cooling fluid pressure drops below an expected cooling fluid pressure level.

In the example of FIG. 5B, various threshold-durations set by the control unit shall be described with reference to the operating stages 502 to 512 explained with respect to FIG. 5A above. In the example of FIG. 5B, the control unit is configured to set a constant threshold-pressure-level (i.e. an expected cooling fluid pressure supplied to the heat generating components), e.g. 5 bar. This may be the maximum-pressure-value of the fluid supply circuit. In other words, the threshold condition set by the control unit may comprise a non-variable threshold-pressure-level 516 and a dynamically set threshold-duration. The threshold-pressure-level may be predetermined by the manufacturer or the operator.

Generally, in the embodiment of FIG. 5B, if the cooling fluid pressure supplied to the heat generating components falls below the predetermined threshold-pressure-level 516 (e.g. 5 bar) the control unit may take remedial action if the cooling fluid pressure remains below the threshold-pressure-level for longer than the threshold-duration set by the control unit. The threshold-duration is set on the basis of the baler-data as will be explained in more detail below with respect to the operating stages 502 to 512 explained with reference to FIG. 5A.

During the first stage 502 of the baler operation, i.e. when the engine of the tractor is being started up and the first clutch is not yet being engaged, only minor amounts of heat are generated within the transmission 38. Accordingly, if the control unit receives baler-data indicative of the baler being in the first stage 502, the control unit may set a threshold-duration to a time period $dt_5$ that is comparatively long as will be clear from the following stages. The threshold-duration $dt_5$ is set by the control unit to be a maximum duration that may be tolerated without remedial action if the cooling fluid pressure is below the predetermined threshold-pressure-level 516 (e.g. 5 bar). Accordingly, if the cooling fluid pressure supplied to the heat generating components during the first stage 502 falls below the threshold-pressure-level 516, the control unit may start a timer. The control unit then compares the time of insufficient cooling fluid pressure (i.e. when the time during which the cooling fluid pressure is below the threshold-pressure-level 516) with the threshold-duration $dt_5$. If the cooling fluid pressure recovers, i.e. exceeds the threshold-pressure-level 516, within a time that is less than the threshold-duration $dt_5$, the control unit may not take remedial action. This is because the transmission 38 may act as a heat buffer that can absorb excess heat, which is generated due to the cooling fluid pressure being below the expected threshold-pressure-level 516, for a limited period of time.

It will be appreciated that the amount of heat that the transmission 38 may absorb before damage occurs is generally a constant heat capacity. Accordingly, during stages of the baler operation that are likely to produce more excess heat, the control unit may decrease the acceptable time delay before remedial action is taken. An example of this is shown in the second stage 504 of FIG. 5B, in which the first clutch 49 is being engaged. If the cooling fluid pressure supplied to the heat generating components falls below the threshold-pressure-level 516 during the second stage 504, this may cause a quicker temperature rise within the transmission 38 due to the large amounts of heat being generated during clutch engagement. Accordingly, the control unit may set the threshold-duration to a shorter period $dt_2$ for the second stage 504. In simple terms, if during the second stage 504 the cooling fluid pressure supplied to the heat generating components drops below the threshold-pressure-level 516, the control unit will take remedial action much quicker than would have been the case during the first stage 502.

Similar to the embodiment described in FIG. 5A, the control unit may vary the threshold-duration in the embodiment of FIG. 5B with every stage 502, 504, 506, 508, 510, 512 on the basis that the different stages 502 to 512 generate different amounts of heat that may lead to heat damages faster or slower. In particular, the control unit may be configured to set a threshold-duration to a time period $dt_4$ during the third and fifth stages 506, 510, in which either the first or second clutches 49, 54 are fully engaged. During engagement of the first and second clutches 49, 54, a shorter threshold-duration $dt_2$ is set by the control unit. During the sixth stage 512, i.e. when braking is commenced, a large amount of heat is generated within the transmission 38 such that the control unit may set the threshold-duration to the shortest time period $dt_1$ of this example. In other words, during the sixth stage 512, the control unit will take remedial action faster than in any of the other stages 502 to 510, if the fluid pressure supplied to the heat generating components drops below the threshold-pressure-level 516. In some embodiments, the threshold-duration $dt_1$ set by the control unit during stage 512 may be zero, such that the control unit will take remedial action immediately after the cooling fluid pressure drops below the threshold-pressure-level 516.

In the embodiment of FIG. 5B, the threshold-duration is set by the control unit purely on the basis of the baler-data received. In particular, the control unit of the example shown in FIG. 5B changes the threshold-duration depending on the various stages 502 to 512 derivable from driveline-data that is part of the baler-data. The control unit of the embodiment of FIG. 5B may not consider how far the cooling fluid pressure has fallen below the predetermined pressure-threshold-level 516 (e.g. 5 bar). Rather, in the embodiment of FIG. 5B, the control unit may be configured to define that any pressure below the predetermined pressure-threshold-level is acceptable for a threshold-duration that is dependent on the baler-data only.

In some examples, the acceptable time delay may be dependent on how much the actual cooling fluid pressure provided to the heat generating components differs from the predetermined threshold-pressure-level. In general, it may be acceptable to maintain operation of the baler for a longer period of time if the cooling fluid pressure provided to the heat generating components is just under the threshold-pressure-level (e.g. around 4.5 bar). By contrast, if the cooling fluid pressure supplied to the heat generating components drops significantly below the threshold-pressure-level 516 (e.g. around 1 bar), an acceptable delay before remedial action is taken may be much shorter than in the first scenario. In this way, the baler-data can include the cooling-pressure-data. Accordingly, in some embodiments, the control unit may be configured to dynamically set the threshold-duration on the basis of the cooling-pressure-data (indicative of the cooling fluid pressure supplied), and optionally also the threshold-pressure-level. That is, the control unit can set the threshold-duration on the basis of the difference between the cooling-pressure-data and the threshold-pressure-level. The difference between the cooling-pressure-data and the threshold-pressure-level can be referred to as a pressure-error-value. In one example, the control unit can use a lookup table to determine the threshold-duration, a non-limiting example of which is provided below:

| pressure-error-value | threshold-duration |
|---|---|
| 0-0.5 bar | 5 s |
| 0.5 bar-1 bar | 30 s |
| 1 bar-2 bar | 90 s |

Optionally, the control unit can apply a linear interpolation between the points, except for below 0.5 bar in this example. For a pressure dip below 0.5 b, the control unit will always apply a threshold-duration of 5 s. Application of the linear interpolation will result in a threshold duration of 20 s for a pressure-error-value of 0.8 bar (20 s=0.3/0.5*25 s+5 s).

Figure 6:
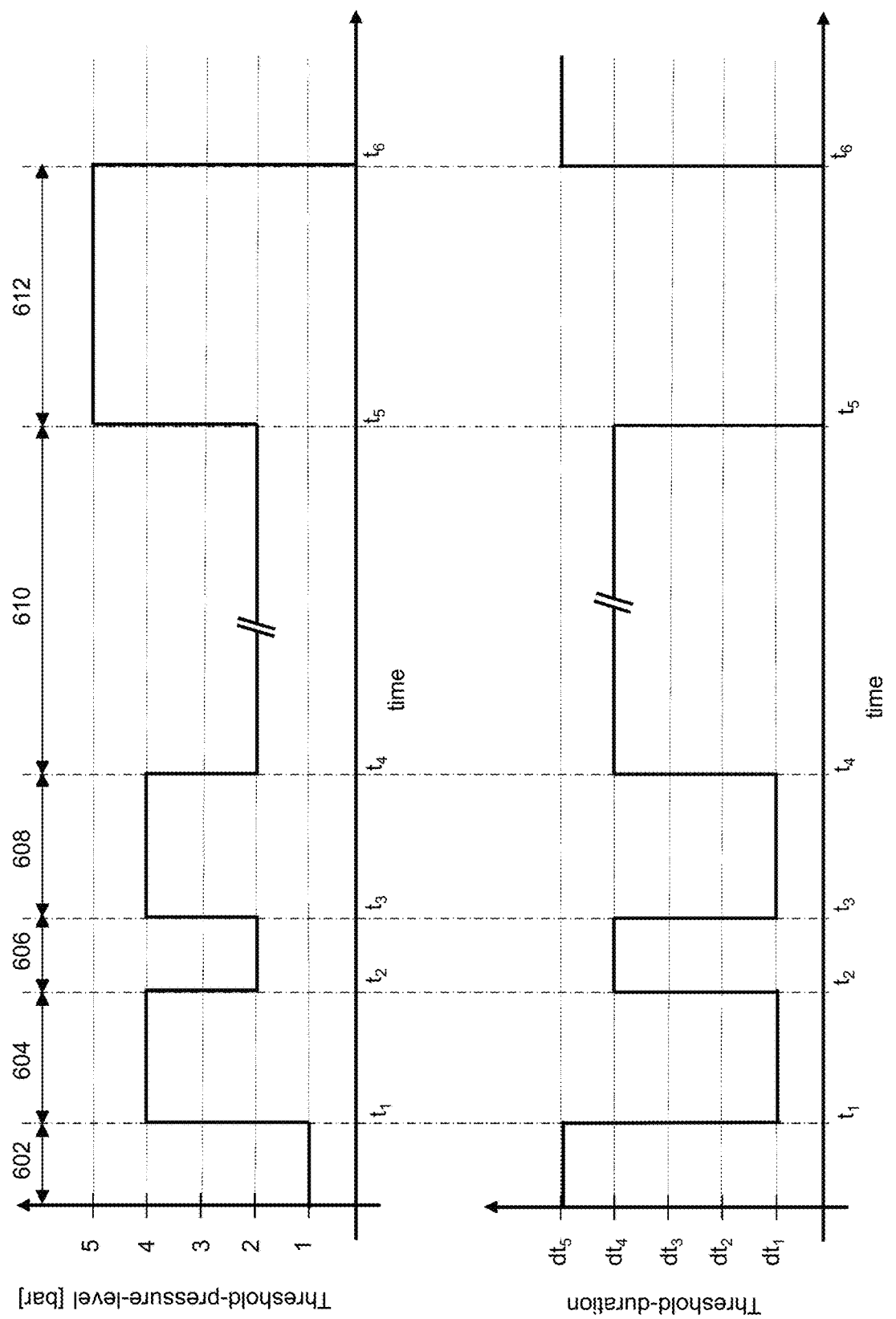
FIG. 6 is a schematic profile illustrating a method of dynamically setting a threshold-duration on the basis of baler-data and a comparison between cooling fluid pressure with a dynamically set threshold-pressure-level.

In the embodiments of FIGS. 5A and 5B, the control unit has been described as dynamically setting only one threshold-condition on the basis of the baler-data received. However, it should be appreciated that the control unit may also dynamically change several threshold-conditions on the basis of the baler-data. One example of an embodiment, in which two threshold-conditions are dynamically set by the control unit is shown in FIG. 6. FIG. 6 refers to the same stages 602 to 612 of the baler operation as the stages 502 to 512 described above with reference to FIGS. 5A and 5B. In the embodiment of FIG. 6, the control unit dynamically sets the threshold-pressure-level and the threshold-duration on the basis of the baler-data. For simplification purposes, the threshold-pressure-levels of FIG. 6 are shown as specific pressure values in bar. However, it will be appreciated that these specific pressure values are not limiting to the present disclosure.

In the embodiment of FIG. 6, the control unit will set the threshold-pressure-level in a similar, if not identical, manner to the embodiment shown in FIG. 5A. That is, the threshold-pressure-level dynamically set by the control unit will change throughout the various stages 602 to 612 of the baler operation on the basis of the baler-data.

As regards the threshold-duration set by the control unit of the embodiment of FIG. 6, it shall assume that the maximum-pressure-value achievable within the cooling system is again set to around 5 bar as described with reference to FIG. 4. However, as will be described in more detail below, the example of FIG. 6 assumes that the cooling fluid pressure provided to the control unit together with the cooling-pressure-data has dropped to a pressure level of 3 bar and so no longer provides the expected cooling performance that the maximum-pressure-value of 5 bar would achieve.

During the first stage 602, if the cooling fluid pressure drops to the above value of 3 bar, the control unit may compare the cooling pressure level of 3 bar to the dynamically set threshold-pressure-level of 1 bar and determine that the cooling fluid pressure is still above the required cooling fluid pressure represented by the dynamically set threshold-pressure-level. Accordingly, the control unit may set the threshold-duration during the first stage 602 to the same time period $dt_5$ as shown in the example of FIG. 5B.

During the second stage 604, if the cooling pressure is applied to the heat generating component drops to a value of 3 bar the control unit may compare this value to the threshold-pressure-level, which is dynamically set in stage 604 to 4 bar. Accordingly, in this example, the control unit will determine that the cooling fluid pressure supplied to the heat generating components has fallen below the expected threshold-pressure-level by 1 bar. After determining the difference between the threshold-pressure-level set during the second stage 604 and the actual cooling fluid pressure provided to the heat generating components the control unit may dynamically set a threshold-duration to a time period $dt_1$. The time period $dt_1$ may be lower than the threshold-duration $dt_2$ applied to the second stage 504 in the embodiment described with reference to FIG. 5B. The same may be applicable to the fourth stage 608, in which the control unit will again dynamically set the threshold-pressure-level to a value of 4 bar. Accordingly, if a cooling fluid pressure received by the control unit in the form of cooling-pressure-data drops to a value of 3 bar the control unit may dynamically set the threshold-duration to a reduced time period of $dt_1$ similar to the second stage 604.

During the third and fifth stages 606, 610 of the baler operation the control unit may set the threshold-pressure-level dynamically to a value of 2 bar. If during the third and fifth stages 606, 610 the cooling fluid pressure supplied to the heat generating components drops to the above value of 3 bar, the control unit will compare this value to the threshold-pressure-level dynamically set for the third and fifth stage 606, 610. The comparison result will be that the cooling fluid pressure is still 1 bar above the threshold-pressure-level, which is set to be 2 bar in this embodiment. Accordingly, the control unit may dynamically set a threshold-duration to a value $dt_4$, which may be the same as the threshold-duration set for the third and fifth stage 506, 510 of the embodiment shown in FIG. 5B.

Finally, during the sixth stage 612, i.e. during activation of the brake 58, the control unit may dynamically set the threshold-pressure-level to 5 bar. The control unit may then compare the cooling fluid pressure supplied to the heat generating components with the above threshold-pressure-level of 5 bar. In the above example of a cooling fluid pressure dropping to a value of 3 bar, the difference between the threshold-pressure-level in the sixth stage 612 and the cooling fluid pressure is 2 bar. On the basis of this comparison result, i.e. a significant difference between the cooling fluid pressure supplied to the heat generating components and the threshold-pressure-level set for the sixth stage 612, the control unit may determine that no delay is acceptable before taking remedial actions. Accordingly, the control unit may set the threshold-duration dynamically to zero on the basis of the above scenario.

The above examples of FIGS. 5A, 5B and 6 have been described with reference to baler-data that comprises driveline-data indicative of a current activation status of the heat generating components within the driveline. However, as described above, the baler-data may also comprise other baler conditions, such as status of the cooling fluid on the basis of which the control unit may set one or more of the threshold-conditions. Similarly, the threshold-conditions described with reference FIGS. 5A, 5B and 6 shall not be considered as limiting to the present disclosure. Rather, the control unit may set other threshold-conditions to avoid heat damage during the baler operation.

As mentioned above, in some embodiments, the control unit may take remedial action as soon as the cooling fluid pressure drops below the predetermined or dynamical threshold-pressure-level. In other embodiments, the control unit may be configured to delay remedial action for a period of time determined by the threshold-duration. The threshold-duration may either be predetermined or dynamically set by the control unit on the basis of the baler-data.

The control unit may be configured to trigger various remedial actions by means of a control-signal that is determined on the basis of a comparison of the cooling fluid pressures to the aforementioned threshold-conditions. In FIG. 4, there is shown an embodiment in which the control unit 144 is configured to provide the control-signal to the transmission 38. According to this embodiment, the control-signal may be applicable to engage/disengage the first and second clutches and/or activate the brake 58. In one example, the control-signal may be applicable to disengage both clutches 49, 54 if the cooling-pressure-data indicates that the cooling fluid pressure is below the threshold-pressure-level for a time period longer than the threshold-duration. Disengaging both clutches 49, 54 will disconnect the input shaft 27 from the flywheel shaft 29 and therefore deactivate the operation of the baler so as to reduce the amount of heat energy generated and avoid heat damages.

In an alternative embodiment, the control unit may be configured to provide a control-signal that is applicable to activate the brake 38 if the cooling-pressure-data indicates that the cooling fluid pressure has dropped below the threshold-pressure-level for a period of time that is longer than a threshold-duration. In this embodiment, an even faster shut down of the agricultural baler may be achieved by actively braking the rotation of the flywheel. However, it should be appreciated that actively braking the flywheel will generate more heat and may be counterproductive to the purpose of the present disclosure. Accordingly, the control unit may determine the appropriate control-signal, e.g. whether or not the flywheel should be actively braked on the basis of a remaining heat capacity of the transmission 38 in view of the heat generated by actively braking the flywheel 28. Also, in some examples, the control unit may provide a control-signal for changing the amount of torque that is transferred by a transmission 38 in an attempt to limit the generated heat (power), such as in the clutch and/or brake.

In some examples, the control unit can set the threshold-pressure-level to a first threshold-pressure-level value, when the baler-data indicates that the clutch 49, 54 is in the process of being engaged. Then the control unit can set the threshold-pressure-level to a second threshold-pressure-level value, when the baler-data indicates that the clutch 49, 54 is disengaged or fully engaged. The second threshold-pressure-level value can be lower than the first threshold-pressure-level value. Such an example can assist with the start-up of the baler, in particular.

In examples where the at least one heat generating component comprises a brake 58. The baler-data can comprise a current activation status of the brake 58. In such examples, the control unit can set the threshold-pressure-level to a first threshold-pressure-level value when the baler-data indicates that brake 58 is active. The control unit can then set the threshold-pressure-level to a second threshold-pressure-level value when the baler-data indicates that the brake 58 is inactive. Again, the second threshold-pressure-level value can be lower than the first threshold-pressure-level value. These first and second threshold-pressure-level values are not necessarily the same as the threshold levels that are used for the clutch. Such an example can assist with the shut-down of the baler, in particular.

Turning to FIG. 7, there is shown a flow diagram of a computer-implemented method 700 according to an embodiment of the present disclosure. The method is for controlling an agricultural baler. The agricultural baler comprises a rotary input shaft connectable by way of a baler driveline to a rotatable flywheel. The driveline comprises at least one heat generating component. The baler also comprises at least one pump for supplying cooling fluid at a cooling fluid pressure to the at least one heat generating component.

The method comprises a first step S702 for receiving baler-data indicative of one or more operating conditions of the agricultural baler. As mentioned before, the baler data may be any baler operating parameter that affects the temperature of components 158, 154 or 149 in the driveline.

In a second step S704, the method comprises receive cooling-pressure-data indicative of the cooling fluid flow provided by the at least one pump. In its simplest form, the cooling-pressure-data may be a pressure measurement provided by a pressure sensor of the baler, such as the pressure sensor 120 described with reference to FIG. 4. However, it will be appreciated that various other data may be indicative of the rate of cooling flow provided by the pump 190.

In a third step S706, the method comprises setting a threshold-condition on the basis of the baler-data. The third step S706 may be performed in parallel with the second step S704.

A fourth step S708 of the method comprises providing a control-signal to the agricultural baler based on a comparison between the cooling-pressure-data and the threshold-condition. If the comparison between the cooling-pressure-data and the threshold-condition is as expected during normal operation, the control-signal may not change the operation of the baler. However, if the comparison result is indicative of imminent heat damage, the control-signal may be applicable to take remedial action to avoid such heat damage.

The listing or discussion of an apparently prior-published document in this specification should not necessarily be taken as an acknowledgement that the document is part of the state of the art or is common general knowledge.

Preferences and options for a given aspect, feature or parameter of the disclosure should, unless the context indicates otherwise, be regarded as having been disclosed in combination with any and all preferences and options for all other aspects, features and parameters of the disclosure.

The invention claimed is:

1. An agricultural system comprising:
   an agricultural baler comprising:
      a driveline comprising at least one heat generating component;
      a rotatable flywheel;
      a rotary input shaft connectable by the driveline to the rotatable flywheel; and
      at least one pump for supplying cooling fluid at a cooling fluid pressure to the at least one heat generating component; and
   a control unit that is configured to:
      receive baler-data indicative of one or more operating conditions of the agricultural baler;
      receive cooling-pressure-data indicative of a flow of the cooling fluid supplied by the at least one pump;
      set a threshold-condition based on the baler-data, the threshold-condition comprising a threshold-duration and a threshold-pressure-level; and
   provide a control-signal to the agricultural baler based on a comparison between the cooling-pressure-data and the threshold-condition,
      wherein the control unit is configured to provide the control-signal based on whether or not the coolingpressure-data is greater than the threshold-pressure-level for a period of time that is at least the threshold-duration.

2. The agricultural system of claim 1, wherein the control unit is further configured to adjust the threshold-duration based on a comparison between the cooling-pressure-data and the threshold-pressure-level.

3. The agricultural system of claim 1, wherein the control-signal is for disconnecting the rotary input shaft from the flywheel.

4. The agricultural system of claim 1,
wherein the at least one heat generating component comprises a clutch, the baler-data comprising a current engagement status of the clutch, and wherein the control unit is further configured to set the threshold-duration such that, when the baler-data indicates that the clutch is in a process of being engaged, the threshold-duration is shorter than when the baler-data indicates that the clutch is disengaged or fully engaged, or
wherein the at least one heat generating component comprises a brake, wherein the baler-data includes driveline-data indicative of a current activation status of the at least one heat generating component of the driveline, the driveline-data comprising a current activation status of the brake, and wherein the control unit is further configured to set the threshold-duration such that, when the baler-data indicates that the brake is active, the threshold-duration is shorter than when the baler-data indicates that the brake is inactive.

5. The agricultural system of claim 1, wherein the baler-data includes driveline-data indicative of a current activation status of the at least one heat generating component of the driveline.

6. The agricultural system of claim 5, wherein the driveline-data comprises one or more of the following:
input-power-data indicative of external input power provided to the agricultural baler;
transmission-control-data indicative of a requested change in transmission;
actuation-pressure-data indicative of a hydraulic fluid pressure that is applied to the at least one heat generating component for actuation; and
position-data indicative of movement of the at least one heat generating component.

7. The agricultural system of claim 1, wherein the baler-data includes cooling-fluid-data indicative of a status of the cooling fluid provided to the at least one heat generating component.

8. The agricultural system of claims 7, wherein the cooling-fluid-data comprises:
data relating to the temperature of the cooling fluid;
data relating to the viscosity of the cooling fluid;
data relating to the service time of the cooling fluid; and
data relating to the type of the cooling fluid.

9. The agricultural system of claim 1, wherein the at least one heat generating component comprises a clutch, and wherein the baler-data comprises a current engagement status of the clutch.

10. The agricultural system of claim 9, wherein:
the control unit is further configured to:
set the threshold-pressure-level to a first threshold-pressure-level value when the baler-data indicates that the clutch is in a process of being engaged; and
set the threshold-pressure-level to a second threshold-pressure-level value when the baler-data indicates that the clutch is disengaged or fully engaged, and
the second threshold-pressure-level value is lower than the first threshold-pressure-level value.

11. The agricultural system of claim 1, wherein the at least one heat generating component comprises a brake, and wherein the baler-data comprises a current activation status of the brake.

12. The agricultural system of claim 11, wherein:
the control unit is further configured to:
set the threshold-pressure-level to a first threshold-pressure-level value when the baler-data indicates that brake is active; and
set the threshold-pressure-level to a second threshold-pressure-level value when the baler-data indicates that the brake is inactive, and
the second threshold-pressure-level value is lower than the first threshold-pressure-level value.

13. A computer-implemented method for controlling an agricultural baler, said baler comprising:
a driveline comprising at least one heat generating component;
a rotatable flywheel;
a rotary input shaft connectable by the driveline to the rotatable flywheel; and
at least one pump for supplying cooling fluid at a cooling fluid pressure to the at least one heat generating component,
wherein the method comprises:
receiving baler-data indicative of one or more operating conditions of the agricultural baler;
receiving cooling-pressure-data indicative of a flow of the cooling fluid supplied by the at least one pump;
setting a threshold-condition based on the baler-data, the threshold condition comprising a threshold-duration and a threshold-pressure-level; and
providing a control-signal to the agricultural baler based on a comparison between the cooling-pressure-data and the threshold-condition,
wherein providing the control-signal comprises providing the control-signal based on whether or not the cooling-pressure-data is greater than the threshold-pressure-level for a period of time that is at least the threshold-duration.

\* \* \* \* \*